H. A. STEEN.
SYSTEM OF MOTOR CONTROL.
APPLICATION FILED MAR. 1, 1911.
1,181,690.
Patented May 2, 1916.
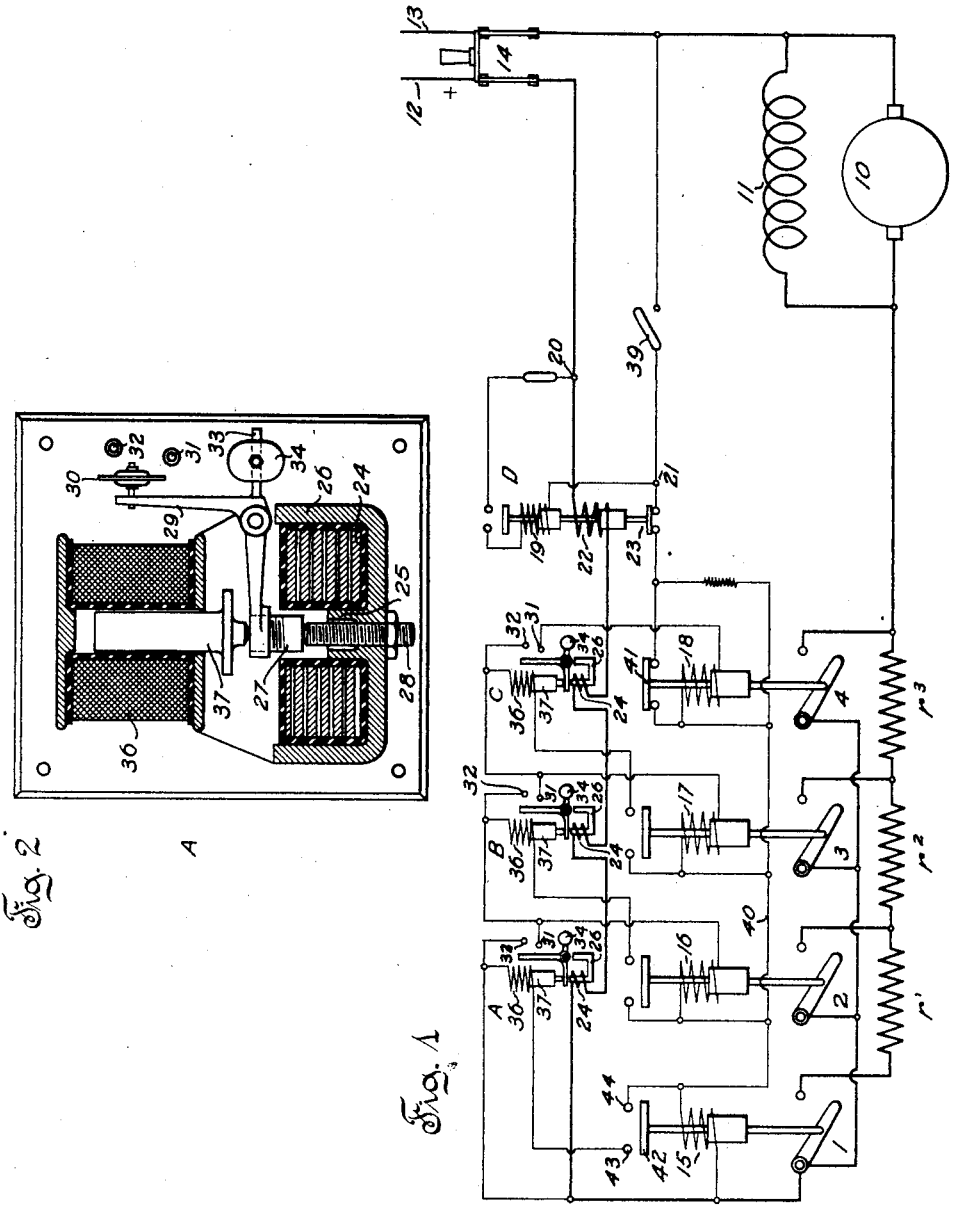

UNITED STATES PATENT OFFICE.

HALFDAN A. STEEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

SYSTEM OF MOTOR CONTROL.

1,181,690.  Specification of Letters Patent.  Patented May 2, 1916.

Application filed March 1, 1911. Serial No. 611,598.

*To all whom it may concern:*

Be it known that I, HALFDAN A. STEEN, a subject of the King of Norway, residing at Milwaukee, in the county of Milwaukee and State of Wisconsin, have invented certain new and useful Improvements in Systems of Motor Control, of which the following is a full, clear, and exact specification.

This invention relates to relays and particularly to relays adapted to govern circuit controlling apparatus in order to prevent the circuit conditions from becoming abnormal.

The object of this invention is to provide for the automatic, gradual, and safe acceleration of motors. This object is accomplished by providing in the motor control system a novel, simple, and inexpensive relay for controlling the operation of switches adapted to cut in and out of the motor circuit resistance, preferably arranged in sections. This novel relay is provided with two coils, a series and a shunt, and these coils together with the other parts of the relay coöperate in a manner to operate resistance switches for increasing the speed of the controlled motor only when the proper conditions for accelerating exist.

The various novel features of my invention will be described in the following specification and particularly set forth in the appended claims.

The invention is illustrated in the accompanying sheet of drawings, in which—

Figure 1 shows diagrammatically a system of motor control having a relay arranged in accordance with my invention; and Fig. 2 is a front elevation, partly in section, of the improved relay.

The motor 10, here shown as having a shunt field 11, is connected to mains 12 and 13 by a switch 14. In order to vary the speed of the motor, sections $r'$, $r^2$, and $r^3$ of resistance are connected in series with the motor armature. These sections of resistance are cut in and out of circuit by automatically operated switches 1, 2, 3, and 4 which are respectively adapted to be actuated by solenoids 15, 16, 17, and 18, the latter being located in the main actuating circuit connected across the line. These switches are further controlled by the action of current responsive devices or relays A, B, and C. Another relay, D, an overload relay, is provided with a shunt coil 19 connected across the line at 20 and 21, and also a series coil 22 adapted to open a switch 23 in the actuating circuit in case the motor armature current should rise above a certain predetermined value. The overload relay D is also provided with a second switch 23ª, which when closed, due to an overload, is held closed by current passing through coil 19. The circuit through said coil 19 may be opened by a switch 23ᵇ to permit switch 23 to be closed.

All of the relays marked A, B, and C, are alike and one of them is shown in detail in Fig. 2. The relay is provided with a series coil 24 which is formed around a stationary core 25 forming part of a yoke 26. This series coil also surrounds a movable core 27 which is held a pre-determined distance from the stationary core 25 by an adjusting screw 28. This adjusting screw passes through the stationary core 25 and engages the movable core 27 for the purpose of adjusting the air gap between said stationary and movable cores. The movable core 27 forms one part of a movable member 29 carrying a bridging contact 30 adapted to engage its coöperating contacts 31 and 32 for circuit connection purposes. This member 29 is also provided with a projection 33 upon which is mounted a weight 34, which may be adjusted upon said projection 33 for the purpose of varying the power arm of the pivotally mounted contact carrying member 29. This relay is also provided with a shunt coil 36 which is adapted to actuate a movable core 37 which is centrally located within said coil 36. The movable core 37 under certain conditions, when the shunt coil is not energized, presses downwardly upon the movable core member 27, forcing said movable core member 27 down into engagement with the adjusting screw 28 against the action of the weight 34. The weight 34 is adjusted on the projection 33 so that the weight of the core 37 is just sufficient to overcome the effect of the weight 34. In this position the bridging contact 30 is out of engagement with its coöperating stationary contacts 31 and 32.

Having thus outlined in general the structural features of the relay and its general purpose in a system of motor control, the operation of the relay in the system will be considered.

The line switch 14 is closed first, after which a switch 39 in the actuating circuit is closed. When these switches have been closed current will pass from the positive main 12, through one side of switch 14, series coil 22 of the overload relay D, series coils 24 of the controlling relays A, B, and C, solenoid 15 of switch No. 1, conductor 40, bridging contact 41 of switch No. 4, switch 23 to the negative side of the line. It is therefore seen that the solenoid 15 will become energized, thus closing switch No. 1. The motor 10 will then be connected to the mains 12 and 13 through all of the series coils of the relays A, B, C, and D, switch No. 1, and sections $r'$, $r^2$, and $r^3$ of resistance. When switch No. 1 has been closed, a bridging contact 42 rigidly connected thereto, is forced into engagement with its coöperating contacts 43 and 44, thus closing a circuit through the shunt coil 36 of relay A. Upon being energized the shunt coil 36 draws up its movable core 37 out of engagement with the movable contact carrying member 29 which is normally biased to a closed position by the weight 34. The movable contact 30 of the relay will immediately move into a closed position providing the current in the series coil, through which passes the motor armature current, is not above a predetermined value. The current which passes through the series coil of the relay A sets up a flux through stationary core 25, yoke 26, a portion of the member 29 and movable core 27. When the motor armature current falls below a certain predetermined value, or has not attained such value, the flux set up by the current through the series coil will be overcome by the weight 34 and the movable contact 30 forced into engagement with its coöperating stationary contacts 31 and 32 when a circuit will be closed through the solenoid 16 of switch No. 2. When switch No. 2 is closed, section $r'$ of resistance is cut out of the motor armature circuit and the motor armature takes on an increment of speed, and a circuit is closed through coil 36 of relay B. Here again, if the current in the motor armature has not risen above a predetermined value the weight 34 will overcome the flux set up as a result of the current passing through the series coil 24 of relay B, thus closing a circuit through the coil 17 of the switch No. 3. With switch No. 3 closed the second section $r^2$ of resistance will be cut out of the motor circuit, thus permitting the motor armature to take on another increment of speed. In a like manner the third section and any number of sections of resistance may be cut out of the motor armature circuit until the motor has attained its full speed.

By using a relay, such as here disclosed, having a shunt lifting coil and a series controlling coil, the latter of which is responsive to predetermined electrical conditions of the motor circuit, a time element is introduced into the system so that a safe and steady step by step acceleration of the motor is accomplished. With this arrangement it is impossible for the successive switches to be closed to cut out sections of resistance for speeding up the motor, unless the proper electrical conditions of the system exist, that is, successive sections of resistance cannot be cut out of the motor circuit when the current in the motor armature is above a certain predetermined value. These relays may be adjusted to suit various conditions and may be used for various purposes including those where a safe and steady acceleration is desired.

There may be arrangements whereby a fewer number of relays may be used, and there may be also other modifications of the precise arrangement herein shown and described, and I aim to cover all such modifications which do not involve a departure from the spirit and scope of my invention as set forth in the appended claims.

What I claim as new is:

1. In a system of control, a power circuit, a plurality of contactors operative to effect certain connections in said power circuit, actuating means for said contactors comprising auxiliary switches normally biased to open position, each of said auxiliary switches controlling the operation of one of said contactors, and means mechanically independent of said contactors and, rendered operative by the actuation of one contactor independently of the load on the circuit for removing the bias from an auxiliary switch and permitting the operation of said switch to a position in which it causes the actuation of another contactor.

2. In a system of control, a power circuit, a plurality of contactors intended for operation in succession to effect certain connections in said power circuit, actuating means for said contactors, auxiliary switches each arranged to control the operation of a contactor, and electromagnetically actuated means comprising an element opposing the actuation of one of said auxiliary switches and an element rendered operative by one contactor for causing the actuation of said switch to a position wherein it effectively controls the operation of a succeeding contactor.

3. In a system of control, a power circuit, a plurality of contactors intended for operation in succession to effect certain connections in said power circuit, means for actuating said contactors comprising auxiliary switches each arranged to control the effective operation of a contactor, and means exercising magnetic effects to oppose and assist the actuation of a contactor, the assisting effect being dependent only on the actuation of a preceding contactor.

4. In a system of control, a power circuit, a plurality of contactors operating to effect certain connections in said power circuit, actuating magnets for said contactors, a plurality of auxiliary switches each of which controls the operation of a contactor, and means for controlling the operation of an auxiliary switch comprising a magnet coil opposing the closure of said switch, a second magnet coil for assisting in such closure, and a switch mechanically connected to another contactor for closing the circuit of said second coil on closure of the latter contactor.

5. In a system of control, an electric circuit, a plurality of contactors operating to effect certain connections in said circuit, an auxiliary switch for controlling the operation of one of said contactors, and means for controlling said auxiliary switch comprising means opposing the actuation of said switch to a position to cause operation of said contactor, and electromagnetically actuated means rendered operative on the actuation of a preceding contactor to assist in the actuation of said switch.

6. In combination, a power circuit, a switch for controlling said circuit, actuating means for said switch, an auxiliary switch for controlling operation of said first switch to effective circuit-controlling position, and means for effectively controlling operation of said auxiliary switch, said controlling means comprising means normally opposing such operation of said auxiliary switch and means for rendering said last mentioned means ineffective as an opposing agent, and electromagnetically actuated means for opposing effective operation of said auxiliary switch during the continuance of predetermined circuit conditions.

Milwaukee, Wis., Feb. 21, 1911.

In testimony whereof I affix my signature, in the presence of two witnesses.

HALFDAN A. STEEN.

Witnesses:
CHAS. L. BYRON,
ROB. E. STOLL.